(12) United States Patent
Ergodan

(10) Patent No.: US 7,753,611 B2
(45) Date of Patent: Jul. 13, 2010

(54) BALL-AND-SOCKET JOINT

(75) Inventor: Cengiz Ergodan, Geldern (DE)

(73) Assignee: TRW Automotive GmbH (DE)

( * ) Notice: Subject to any disclaimer, the term of this patent is extended or adjusted under 35 U.S.C. 154(b) by 66 days.

(21) Appl. No.: 11/659,883

(22) PCT Filed: Aug. 11, 2005

(86) PCT No.: PCT/EP2005/008730

§ 371 (c)(1),
(2), (4) Date: Sep. 10, 2007

(87) PCT Pub. No.: WO2006/018218

PCT Pub. Date: Feb. 23, 2006

(65) Prior Publication Data

US 2008/0279618 A1 Nov. 13, 2008

(30) Foreign Application Priority Data

Aug. 11, 2004 (DE) .................... 20 2004 012 604 U

(51) Int. Cl.
F16C 11/06 (2006.01)
(52) U.S. Cl. .................................................... 403/138
(58) Field of Classification Search ................ 403/122, 403/134–136, 138, 141–144
See application file for complete search history.

(56) References Cited

U.S. PATENT DOCUMENTS

| 3,483,888 | A | * | 12/1969 | Wurzel ...................... 137/539 |
| 3,813,178 | A | * | 5/1974 | Herbenar et al. ............... 403/27 |
| 3,820,908 | A | * | 6/1974 | Maxeiner et al. ............ 403/133 |
| 4,113,396 | A |   | 9/1978 | Smith |
| 4,163,617 | A | * | 8/1979 | Nemoto ....................... 403/132 |
| 4,358,211 | A | * | 11/1982 | Goodrich et al. .............. 403/27 |
| 4,415,291 | A |   | 11/1983 | Smith |
| 4,576,499 | A | * | 3/1986 | Smith .......................... 403/27 |
| 4,720,205 | A | * | 1/1988 | Ito ............................... 403/140 |
| 4,790,682 | A | * | 12/1988 | Henkel ....................... 403/140 |
| 5,551,791 | A | * | 9/1996 | Schneider ................... 403/144 |
| 5,672,023 | A | * | 9/1997 | Lieber et al. ................ 403/138 |
| 6,030,141 | A | * | 2/2000 | Lieber et al. ................ 403/135 |
| 6,413,003 | B1 | * | 7/2002 | Schmidt et al. ............. 403/120 |
| 6,733,200 | B2 | * | 5/2004 | Ueno .......................... 403/133 |
| 6,802,289 | B2 | * | 10/2004 | Miyazaka et al. ......... 123/90.17 |

FOREIGN PATENT DOCUMENTS

| DE | 1 826 870 | 2/1961 |
| DE | 1826870 U | 2/1961 |
| JP | 60-208622 | 10/1985 |
| JP | 60208622 | 10/1985 |

* cited by examiner

Primary Examiner—Daniel P Stodola
Assistant Examiner—Joshua T Kennedy
(74) Attorney, Agent, or Firm—MacMillan, Sobanski & Todd, LLC

(57) ABSTRACT

A ball-and-socket joint, especially for tie rods and steering rods of utility vehicles, has a housing, a ball pivot with an essentially spherical bearing section that is mounted in the housing, a cover that is installed on the housing, and a spring element that has a support section and a spring section. The spring section lies radially outside of the support section and the spring element rests on the cover and on the bearing section.

8 Claims, 2 Drawing Sheets

BALL-AND-SOCKET JOINT

CROSS-REFERENCE TO RELATED APPLICATIONS

This application is a national stage of International Application No. PCT/EP2005/008730 filed Aug. 11, 2005, the disclosures of which are incorporated herein by reference in entirety, and which claimed priority to German Patent Application No. 20 2004 012 604.4 filed Aug. 11, 2004, the disclosures of which are incorporated herein by reference in entirety.

BACKGROUND OF THE INVENTION

The present invention relates to a ball-and-socket joint, especially for tie rods and steering rods of utility vehicles.

Such ball-and-socket joints are known and, in addition to having a housing, a ball pivot with an essentially spherical bearing section that is mounted in the housing and a cover that is installed on the housing, they usually also have an upper bearing shell as well as a spiral spring that is arranged as a pressure spring between the cover and the upper bearing shell in order to keep the joint free of clearance. In the past, various attempts have been made to configure ball-and-socket joints with a simplified structure, if possible, reducing the number of components, which is also the objective of the present invention.

BRIEF SUMMARY OF THE INVENTION

According to the invention, a ball-and-socket joint has a housing, a ball pivot with an essentially spherical bearing section that is mounted in the housing, a cover that is installed on the housing, and a spring element that has a support section and a spring section, the spring section lying radially outside of the support section and the spring element resting on the cover and on the bearing section. In an advantageous manner, such a ball-and-socket joint combines the upper bearing shell that is familiar from the state of the art and the spiral spring that serves to compensate for manufacturing tolerances and for wear that occurs during use so as to form one single component, namely, the spring element. This reduces the number of requisite components and the structural size of the joint. Another advantage ensues from the fact that the spring element rests on the cover, as a result of which a much higher tension force can be achieved than, for example, with a configuration having a spring element that is clamped on the edge by the cover.

Preferably, the spring section consists of several spring tongues. This results in a simple and inexpensive component that can be made, for example, employing a stamping process.

According to a preferred embodiment, the spring element has a cylindrical holding section that encircles an opening in the middle of the spring element, the cover has a cylindrical guide surface, and the guide surface engages the holding section. Consequently, a radial movement of the spring element is effectively prevented in case of an angular deflection of the ball pivot, which would otherwise lead to an excessive bending stress in the bending radius of the spring tongues and would thus substantially diminish the service life of the spring element.

The support section is preferably shaped like a spherical segment between two parallel circles and, in the mounted state, it lies against the surface of the bearing section, thus preventing clearance in the ball-and-socket joint.

Advantageously, the cover has an area shaped like a spherical segment between two parallel circles that serves as a stop for the support section. Thus, excessive mechanical stress on the spring element can be avoided, since it comes to rest on the stop when an axial force is exerted in the direction of the cover.

The cover can have an encircling deformation rib by means of which the axial position of the cover can be adjusted at will within a certain range by measuring the axial elasticity or the torque during the assembly process, so as to compensate for manufacturing tolerances of the individual components.

Preferably, the cover has an annular spreading section on which, according to a preferred embodiment, the spring tongues rest, as a result of which the spring tongues can be spread radially outwards. Hence, the radial pre-tensioning of the spring elements needed to support the spherical bearing section is generated automatically during the installation of the cover.

The combination of the spring element and the cover in the mounted state can have a degressive spring characteristic, a linear spring characteristic or a progressive spring characteristic. Thus, the ball-and-socket joint can optimally be adapted to individual requirements.

Preferably, an elastomer insert is provided that is positioned between the spring element and the cover, as a result of which the characteristics of the ball-and-socket joint can be further influenced.

Other advantages of this invention will become apparent to those skilled in the art from the following detailed description of the preferred embodiment, when read in light of the accompanying drawings.

DETAILED DESCRIPTION OF THE INVENTION

Figure 1:
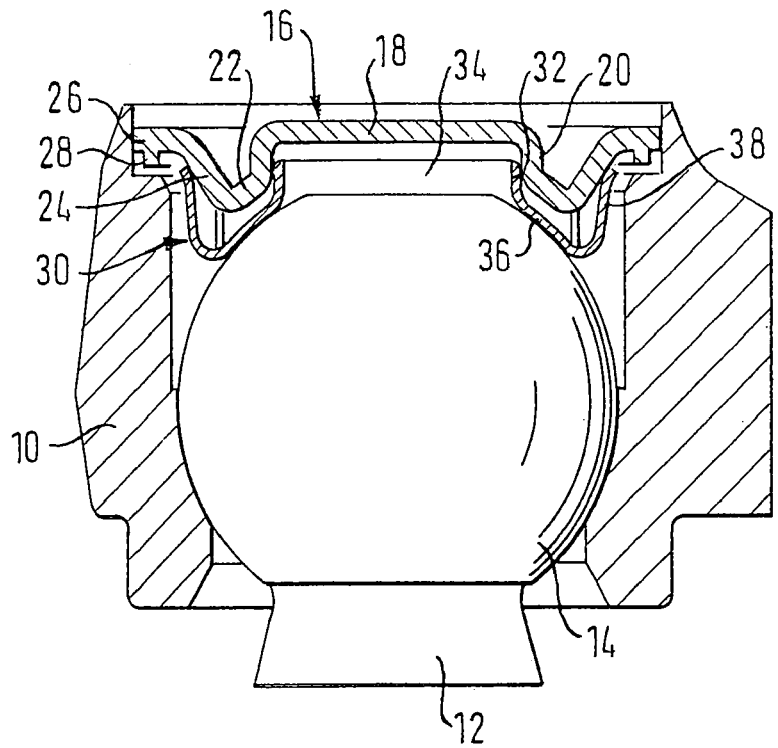
FIG. 1 shows a longitudinal section through a ball-and-socket joint according to the invention before the installation of the cover.

The ball-and-socket joint shown in FIG. 1 in a sectional view in the state before the installation of the cover comprises a housing 10 and a ball pivot 12 with an essentially spherical bearing section 14 that is mounted in the housing 10.

Moreover, there is a cover 16 that can be installed on the housing 10 and that, in a top view, is essentially circular. The cover 16 has a circular flat middle part 18 which is followed by a cylindrical guide surface 20 in the radial outward direction. Moreover, the cover 16 comprises an area 22 shaped like a spherical segment between two parallel circles and arranged outside of the cylindrical guide surface 20, an adjacent annular spreading section 24 that makes a transition to a likewise annular edge area 26, as well as a deformation rib 28 arranged on the edge area 26.

Between the cover 16 and the spherical bearing section 14, there is a spring element 30 that has a cylindrical holding section 32 encircling a circular opening 34 in the middle of the spring element 30. The cylindrical holding section 32 makes a transition outwards into a support section 36 that is shaped like a spherical segment between two parallel circles and that, in turn, spreads out into an annular spring section 38. The spring section 38 here is formed by several spring tongues 40 as can be seen in FIG. 3.

In the assembly of the ball-and-socket joint, first of all, the spring element 30 is placed from the top onto the spherical bearing section 14 in such a way that the support section 36 that is shaped like a spherical segment between two parallel circles lies on the surface of the bearing section 14. Subsequently, the cover 16 is put into place and attached, whereby its cylindrical guide surface 20 engages the holding section 32 of the spring element 30 that comes to lie inside the guide surface 20. By means of the deformation rib 28, the axial positioning of the cover 16 can be adjusted at will by measuring the axial elasticity or the torque during the assembly process so as to compensate for the manufacturing tolerances of the individual components.

Figure 2:
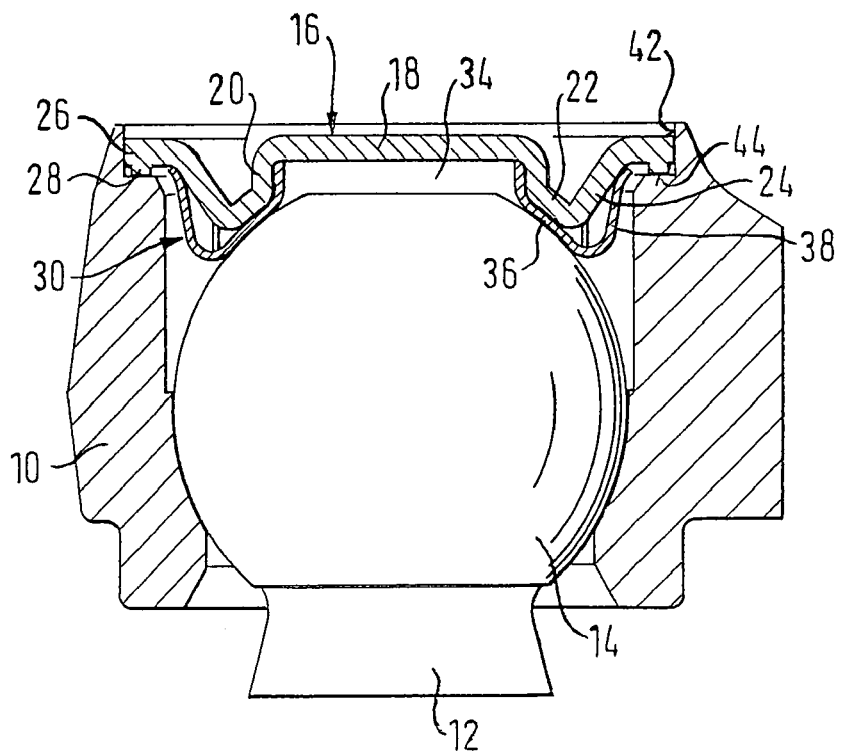
FIG. 2 shows a longitudinal section through the joint of FIG. 1 after the installation of the cover.

FIG. 2 shows the ball-and-socket joint in the mounted state, the deformation rib 28 being slightly deformed here. The edge area 26 of the cover 16 lies on an edge 42 of a cylindrical recess of the housing 10, whereas the deformation rib 28 lies on a shoulder 44 that delimits the cylindrical recess downwards.

Figure 3:
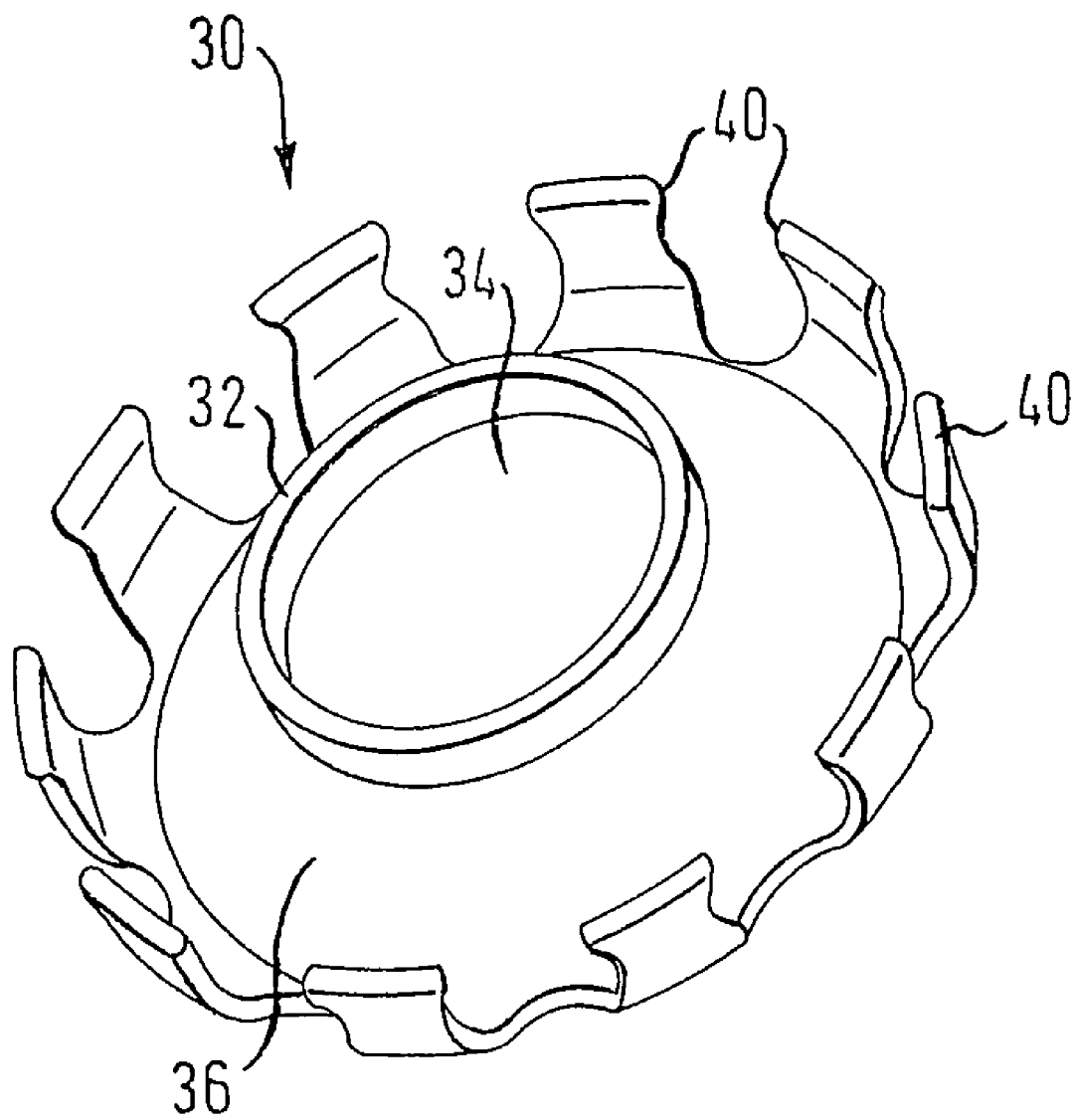
FIG. 3 shows a perspective view of an appertaining spring element.

The spring tongues 40 rest on the spreading section 24, as a result of which they are spread radially outwards and consequently are pretensioned radially outwards relative to their initial state (FIGS. 1, 3). This pretensioning brings about a spring force that is transferred to the spherical bearing section 14 via the support section 36, this spring force serving to compensate for manufacturing tolerances and for wear that occurs during use.

Here, the axial pretensioning of the ball pivot 12 can be adjusted, on the one hand, by the thickness of the spring element 30 and, on the other hand, by the axial displacement of the cover 16 towards the middle point of the spherical bearing section 14 that is made possible by the deformation rib 28. The joint is thus characterized by an axial elasticity that can be systematically adjusted during the assembly process.

Moreover, by appropriately shaping the annular spreading section 24, a degressive, a linear or a progressive spring characteristic can be attained, as desired.

In addition, the possibility exists to influence the characteristics of the joint by positioning an elastomer insert between the spring element 30 and the cover 16.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A ball-and-socket joint, adapted for tie rods and steering rods of utility vehicles, comprising:
   a housing;
   a ball pivot having an essentially spherical bearing section that is mounted in the housing;
   a cover that is installed on the housing and includes a closed cover end having a central cylindrical guide surface extending from the closed cover end and an annular radially outwardly extending spreading section; and
   a spring element resting on the cover and on the bearing section comprising:
      a support section,
      a spring section made up of several spring tongues lying radially outside of the support section, wherein the spring tongues rest on the spreading section and are capable of being spread radially outwards by means of the annular radially outwardly extending spreading section, and
      a cylindrical holding section lying radially inside of the support section and encircling an opening provided in the middle of the spring element, wherein the cylindrical holding section of the spring element extends into and engages the cylindrical guide surface of the cover.

2. The ball-and-socket joint according to claim 1, wherein the spring tongues are pretensioned radially outwards relative to their initial state.

3. The ball-and-socket joint according to claim 1, wherein the support section is shaped like a spherical segment between two parallel circles and, in a mounted state, lies against the bearing section.

4. The ball-and-socket joint according to claim 3, wherein the cover has an area shaped like a spherical segment between two parallel circles that serves as a stop for the support section.

5. The ball-and-socket joint according to claim 1, wherein the cover has an encircling deformation rib.

6. The ball-and-socket joint according to claim 1, wherein the combination of the spring element and the cover in the mounted state has a degressive spring characteristic.

7. The ball-and-socket joint according to claim 1, wherein the combination of the spring element and the cover in the mounted state has a linear spring characteristic.

8. The ball-and-socket joint according to claim 1, wherein the combination of the spring element and the cover in the mounted state has a progressive spring characteristic.

* * * * *